United States Patent [19]

Maurizio

[11] Patent Number: 5,613,401
[45] Date of Patent: Mar. 25, 1997

[54] TRANSMISSION FOR AGRICULTURAL TRACTORS

[75] Inventor: Galli Maurizio, Carpi, Italy

[73] Assignee: New Holland North America, Inc., New Holland, Pa.

[21] Appl. No.: 512,604

[22] Filed: Aug. 8, 1995

[30] Foreign Application Priority Data

Aug. 9, 1994 [IT] Italy .................. TO94A2657

[51] Int. Cl.⁶ .................. F16H 61/28; F16H 63/12
[52] U.S. Cl. .................. 74/325; 74/330; 74/331
[58] Field of Search .................. 74/329, 330, 325, 74/331, 745

[56] References Cited

U.S. PATENT DOCUMENTS

| | | | |
|---|---|---|---|
| 3,589,483 | 6/1971 | Smith | 74/331 X |
| 4,738,149 | 4/1988 | Janiszewski | 74/330 |

FOREIGN PATENT DOCUMENTS

| | | | |
|---|---|---|---|
| 61-274146 | 12/1986 | Japan | 74/331 |
| 6-185583 | 7/1994 | Japan | 74/325 |
| 6-229469 | 8/1994 | Japan | 74/325 |
| 1706900 | 1/1992 | U.S.S.R. | 74/331 |

*Primary Examiner*—Khoi Q. Ta
*Attorney, Agent, or Firm*—Larry W. Miller; John William Stader; Frank A. Seemar

[57] ABSTRACT

A vehicle transmission presents a main stage and a range reducer cascade connected to each other. The main stage includes an input shaft, two drive shafts coaxial with each other and selectively connected to the input shaft by respective hydraulic clutches, a countershaft, and a driven shaft connectable to the countershaft according to a number of gear ratios. The countershaft is selectively connectable to one of the drive shafts directly or via an inverting train by means of a first synchronized clutch, and is selectively connectable to the other drive shaft according to a step-down ratio and a step-up ratio by means of a second synchronized clutch. The hydraulic clutches and first and second synchronized clutches are controlled by an electronic control unit in response to manual operation and in predetermined sequences.

12 Claims, 1 Drawing Sheet

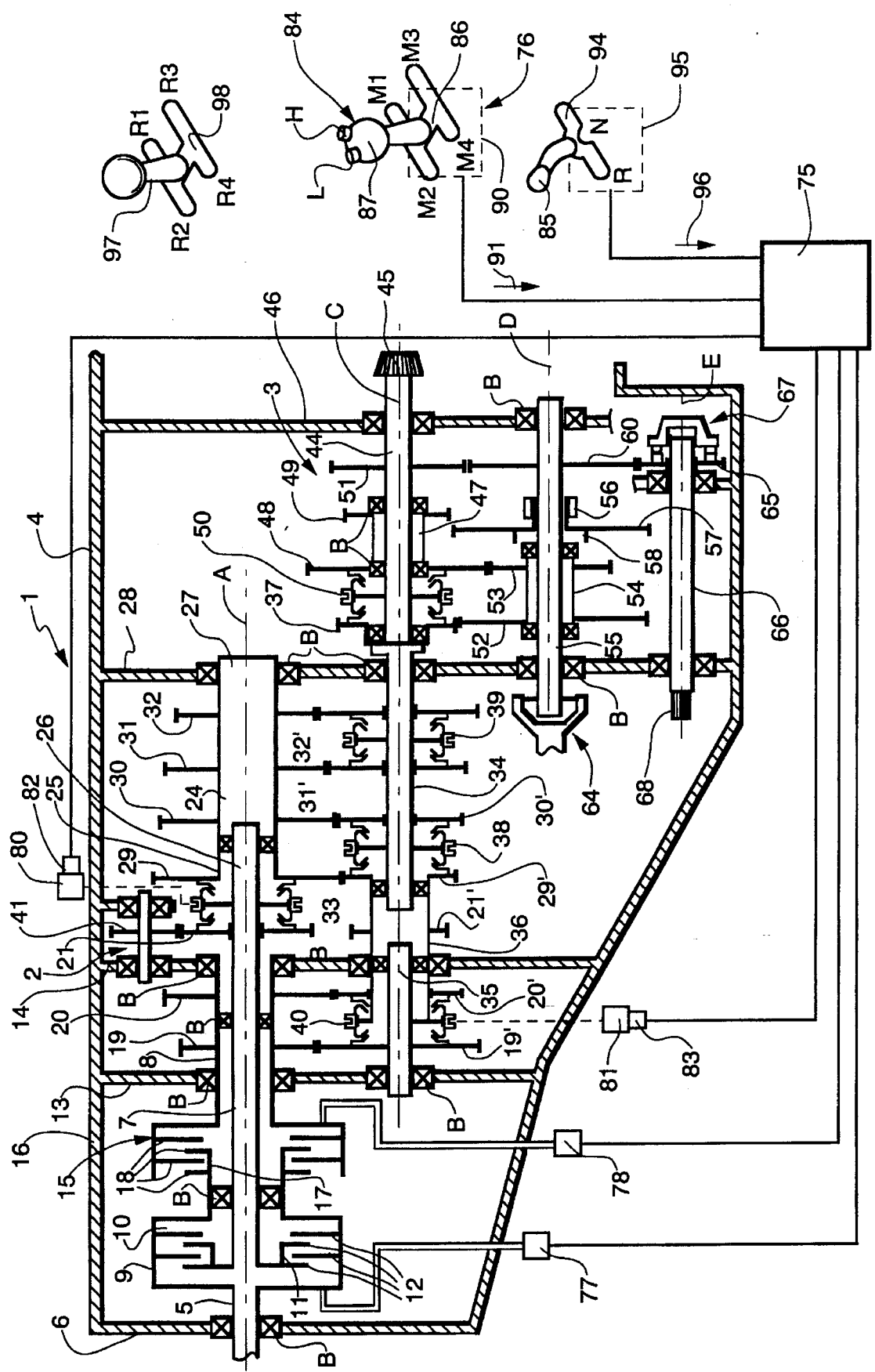

TRANSMISSION FOR AGRICULTURAL TRACTORS

BACKGROUND OF THE INVENTION

The present invention relates to a vehicle transmission with a large number of gears, particularly for farm tractors.

Transmissions are known which permit gear shifting under load, i.e. without interrupting torque transmission from the engine to the wheels. This is normally achieved using selectively engageable clutches, one for each gear, or using two clutches, one each for a respective drive shaft, the drive shafts being connectable to a driven shaft by means of respective numbers of gears defining different gear ratios.

In both cases, the total number of available gear ratios is relatively small, thus preventing the full power of the engine from being exploited in all possible operating conditions of the vehicle, and particularly when the engine is used to power auxiliary attachments by means of a power take-off device operatively connected to the transmission. Moreover, only a small number of reverse gears are normally available, and in any case fewer than the number of forward gears.

SUMMARY OF THE INVENTION

It is therefore an object of the present invention to provide a vehicle transmission with a large number of gears, particularly for farm tractors, and designed to overcome the drawbacks typically associated with known transmissions of the aforementioned type.

It is a further object of the present invention to provide a vehicle transmission, particularly for farm tractors, having a large number of gears; an input shaft for receiving motion from the vehicle engine; first and second drive shafts coaxial with each other; first and second hydraulic clutches for selectively connecting said input shaft to said first drive shaft and to said second drive shaft; at least one driven shaft; and a transmission mechanism interposed between said first and second drive shafts and said driven shaft, and defining respective numbers of gear ratios.

It is a feature of this invention that the transmission mechanism includes at least a first countershaft drivingly engageable with said driven shaft according to a first number of gear ratios; a first synchronized clutch for selectively connecting said first countershaft to said first drive shaft according to a first and second gear ratio; and a second synchronized clutch for selectively connecting said first countershaft to said second drive shaft according to a third and fourth gear ratio respectively lower and higher than said first gear ratio.

BRIEF DESCRIPTION OF THE DRAWING

The advantages of this invention will be apparent upon consideration of the following detailed disclosure of the invention, especially when taken in conjunction with the accompanying drawings wherein:

The drawing is a schematic cross-sectional view of an agricultural tractor transmission having a large number of gears and incorporating the principles of the instant invention.

DETAILED DESCRIPTION OF THE PREFERRED EMBODIMENT

Referring now to the drawing, a representative view of a transmission for an agricultural tractor incorporating the principles of the instant invention can best be seen. The transmission 1 substantially incorporates a main stage 2 and a range reducer 3 connected in a cascade fashion to each other and housed in an elongated outer casing 4. The main stage 2 includes an input shaft 5 having a longitudinal axis A in relation to casing 4, supported on end wall 6 of the casing, and being powered in a conventional manner by the vehicle engine (not shown) via a main clutch (not shown), as is well known in the art.

It will be noted that the expression "support" used throughout the following description in connection with moving parts obviously implies the interposition of roller or friction bearings B, which are schematically depicted in the accompanying drawing, and without any detailed description of the characteristics or the way in which they are assembled, as this is well known in the art.

The main stage 2 further includes a first drive shaft 7 having the same axis A as the input shaft 5 and furthermore a second hollow drive shaft 8 coaxial with and housing shaft 7, and supported radially and axially on transverse walls 13 and 14 of casing 4.

A first hydraulic clutch 9 is interposed between input shaft 5 and first drive shaft 7, and comprises an outer casing 10 and a hub 11 angularly integral respectively with input shaft 5 and first drive shaft 7, and angularly connectable to each other by means of a number of friction disks 12. A second hydraulic clutch 15 is interposed between input shaft 5 and second drive shaft 8, and comprises an outer casing 16 angularly integral with second drive shaft 8, and a hub 17 angularly integral with the casing 10 of said first clutch 9 and hence with input shaft 5; casing 16 and hub 17 being angularly connectable to each other by means of a number of friction disks 18.

The second drive shaft 8 is provided with a small-diameter gear 19 and a large-diameter gear 20. The first drive shaft 7 projects axially outwardly of shaft 8, and is provided on its projecting portion with an axially-fixed but angularly-idle gear 21.

The main stage 2 also includes a countershaft 24 oriented along axis A, which, at one end 25, is radially supported in angularly free manner on the free end 26 of first drive shaft 7, and, close to its opposite end 27, is supported radially on transverse wall 28 of casing 4. The countershaft 24 is integrally provided with four axially spaced gears 29, 30, 31, 32 with progressively decreasing diameters, and of which gear 29 is fitted to said end 25. Gears 21 and 29 are selectively connectable to first drive shaft 7 by means of a synchronized clutch 33, whereby engagement of gear 29 effects a direct drive between first drive shaft 7 and countershaft 24.

The main stage 2 further includes a driven shaft 34 having a longitudinal axis C which is oriented parallel to axis A. At the end facing wall 6 of casing 4, driven shaft 34 is supported inside a coaxial, hollow countershaft 36 in turn supported in angularly free manner on wall 14 of casing 4. Close to its opposite end forming a pinion 37, driven shaft 34 is supported by wall 28. Four gears 29', 30', 31', 32' are provided in an idle fashion on driven shaft 34; these gears meshing permanently with respective gears 29, 30, 31, 32 of countershaft 24, and of which gear 29' is formed integrally on an end portion of shaft 36.

Gears 29', 30' are selectively connectable to driven shaft 34 by means of a synchronized clutch 38 axially interposed therebetween. In exactly the same manner, gears 31', 32' are selectively connectable to driven shaft 34 by means of a synchronized clutch 39 interposed between said gears 31' and 32'.

Gear 19 of the second drive shaft 8 meshes with a gear 19' integrally provided on a hub 35 supported in angularly free manner at either end respectively by wall 13 of casing 4 and by shaft 36. Gear 20 of second drive shaft 8 meshes with a gear 20' fitted idly onto shaft 36. Gears 19' and 20' are selectively connectable to shaft 36 by means of a synchronized clutch 40 interposed axially therebetween.

Gear 21 of first drive shaft 7 is drivingly connected, by means of an idle reversing gear 41, to a gear 21' fixedly provided on shaft 36. For the sake of simplicity, gear 41, the axis of which does not lie in the sectional plane of the drawing, is shown meshing with gear 21 only, though in reality it obviously also meshes with gear 21'.

The driven shaft 34 constitutes the input shaft of range reducer 3 of transmission 1. Range reducer 3 comprises an output shaft 44 coaxial with and supported at one end inside shaft 34, and which, close to its opposite end provided integrally with the output pinion 45 of transmission 1, is supported on an end wall 46, opposite wall 6, of casing 4. The output shaft 44 is fitted in axially-free, angularly-fixed manner with a sleeve 47 integrally defining a large-diameter gear 48 and a small-diameter gear 49 respectively located on the end of the sleeve facing pinion 37 and on the end of the sleeve facing end wall 46 of casing 4.

The pinion 37 and gear 48 are selectively connectable to output shaft 44 by means of a synchronized clutch 50 interposed axially between pinion 37 and gear 48, so that output shaft 44 may be made integral with either driven shaft 34 or sleeve 47. An output shaft 44 is further provided, close to wall 46, with a gear 51. The pinion 37 and gear 48 mesh permanently respectively with gears 52 and 53, which are integral with a sleeve 54 fitted in an idle manner to a countershaft 55 supported on walls 28 and 46 of casing 4 and presenting an axis D parallel to axes A and C. The countershaft 55 is fitted in angularly fixed manner with an axially slidable sleeve 56 integrally defining a gear 57. The sleeve 56 is movable axially between a first position wherein it engages sleeve 54 by means of a splined coupling 58, and a second position wherein gear 57 meshes with gear 49 of sleeve 47. The countershaft 55 is further provided with a gear 60 meshing with gear 51 of output shaft 44.

At the end facing end wall 6 of casing 4, the countershaft 55 is connected by an elastic joint 64 to a power take-off device (not shown). The gear 60 of countershaft 55 meshes with a small-diameter gear 65 fitted idly onto a shaft 66 having an axis E parallel to axis D, and connectable to shaft 66 by means of a hydraulic clutch 67. Shaft 66 defines a further power take-off 68 of transmission 1.

The transmission 1 comprises an electronic control unit 75 for controlling clutches 9, 15 and synchronized clutches 33, 40 in response to input signals supplied by manual selecting means indicated as a whole by reference number 76 and described in detail hereafter. More specifically, clutches 9 and 15 are controlled by respective built-in hydraulic pistons (not shown) acting respectively on friction disks 12 and 18, and which are operated by respective proportional-response solenoid valves 77, 78 controlled by unit 75.

By intermediary of conventional transmission means, e.g. rod and fork type devices, synchronized clutches 33, 40 are operated by respective three-position hydraulic valves 80, 81 controlled by respective solenoid valves 82, 83 in turn controlled by unit 75.

Via other conventional transmission means (not shown), synchronized clutches 38, 39 are operated mechanically by a gear lever 84, which may be set to four positions M1, M2, M3, M4 defined by the extreme positions of an H-shaped path 86. The lever 84 presents a knob 87 at the top with a pair of pushbuttons L, H forming part of said manual selecting means 76. The lever 84 comprises switching means 90, which are conventional in the art and therefore not described in detail, and which are intended to supply control unit 75 with electric input signals 91 in response to manual operation of buttons L and H.

The manual selecting means 76 also includes a reversing lever 85 which is movable along a shaped, substantially straight path 94 presenting a V-shaped central portion and defining three stable positions F, N, R of lever 85: a central position (N), and two limit positions (F, R). The lever 85 presents conventional switching means 95 (not described in detail) for supplying control unit 75 with electric input signals 96 in response to manual operation of lever 85.

The clutch 50 and sleeve 56 are operated manually by a mechanical lever 97, which may be set to four positions R1, R2, R3, R4 defined by the extreme positions of an H-shaped path 98, and is selectively connectable to clutch 50 and sleeve 56 through known transmission members (not shown).

The transmission 1 operates as follows. For the sake of simplicity, an initial operating condition of the transmission 1 is assumed in which clutch 9 is closed; clutch 15 is open; clutch 33 is shifted to the right as seen in the drawing (position F of lever 85) so that countershaft 24 is integral with first drive shaft 7; clutch 40 is shifted to the left, so that gear 19' is integral with shaft 36; and countershaft 24 is therefore connected angularly to input shaft 5.

In the above condition, the transmission 1 operates in the same way as a conventional transmission with two cascade stages (main stage 2 and range reducer 3). The main stage 2 defines four gear ratios namely m1, m2, m3 and m4 between countershaft 24 and driven shaft 34 by respectively transmitting motion via gear pairs 32, 32'; 31, 31'; 30, 30' and 29, 29'. These gear ratios are selectively engaged by shifting lever 84 to corresponding positions M1, M2, M3, M4, in response whereto the gear (32', 31', 30', 29') corresponding to the selected ratio is connected to driven shaft 34.

The range reducer 3 in turn defines four gear ratios r1, r2, r3, r4 between driven shaft 34 and output shaft 44, and therefore, in combination with main stage 2, four ranges or groups of four gears each. The gear ratios of the sixteen gears so defined—and referred to hereinafter as "normal gears"—form a regular progression and vary steadily from one range to the next.

Ratio r1 (position R1 of lever 97) is obtained by moving sleeve 56 to the right and in so doing meshing gears 57 and 49, so that torque is transmitted from driven shaft 34 to sleeve 54, to sleeve 47, to countershaft 55 and hence to output shaft 44 via gear pairs 37–52, 53–48, 49–57 and 60–51.

Ratio r3 (position R3 of lever 97) is obtained by moving sleeve 56 to the left and as such connecting it to sleeve 54, so that motion is transmitted from driven shaft 34 to sleeve 54 and to countershaft 55 integral therewith via gear pair 37–52, and finally to output shaft 44 via gear pair 60–51.

Ratio r2 (position R2 of lever 97) is obtained by moving clutch 50 to the right so that gear 48 becomes integral with output shaft 44, and torque is transmitted from driven shaft 34 to sleeve 54 via gear pair 37–52, and from sleeve 54 to output shaft 44 via gear pair 53–37. Finally, ratio r4 (position R4 of lever 97) is obtained by moving clutch 50 to the left and as such connecting output shaft 44 directly to driven shaft 34.

Starting from any one of the above described normal gears, three possibilities are available: shifting to a corresponding "low gear" using button L; shifting to a corresponding "high gear" using button H; and shifting to a reverse gear using lever 85.

The terms "low gear" and "high gear" indicate two auxiliary gears, the ratios of which are respectively reduced and increased in relation to a corresponding normal gear by an interval which is smaller, typically less than half, than the interval between the ratio of the normal gear and the one adjacent to it.

Preferably, if the gear ratios of the normal gears alone define a geometric progression with a common quotient Q, then the normal gears, low gears and high gears as a whole define a "tighter" progression with a common difference $\sqrt[3]{Q}$.

More specifically, when button L is operated, control unit 75 switches solenoid valves 77, 78 to release clutch 9 and at the same time engage clutch 15 according to predetermined variations in pressure, so that torque is transmitted, without any interruption in power, to second drive shaft 8, from second drive shaft 8 to shaft 36 via gear pair 19—19', to countershaft 24 via gear pair 29'—29, and from countershaft 24 to the output shaft along the path described above with reference to the normal gears. If the gear ratio engaged in main stage 2 is m1, m2 or m3, power is transmitted to driven shaft 34 via countershaft 24 and the corresponding gear pairs 32—32', 31—31' or 30—30'; and, if ratio m4 is engaged, driven shaft 34 is connected directly to shaft 36 while countershaft 24 is rotating idle.

Gear pairs 19—19' and 29—29' are sized as to produce the aforementioned predetermined reduction in relation to the corresponding normal gear defined by direct connection of first drive shaft 7 and countershaft 24.

When button H is operated to pass from a normal to a high gear, control unit 75 switches solenoid valve 83 for controlling the position of the clutch 40 so as to connect gear 20' to shaft 36, and then switches solenoid valves 77, 78 to release clutch 9 and at the same time engage clutch 15 according to predetermined variations in pressure. As such, torque is transmitted, with no interruption in power, to second drive shaft 8, from second drive shaft 8 to shaft 36 via gear pair 20—20', and from shaft 36 to driven shaft 34 and output shaft 44 as described with reference to engagement of the low gear. Gear pairs 20—20' and 29—29' are sized as to produce the aforementioned predetermined increase in relation to the corresponding normal gear defined by direct connection of first drive shaft 7 and countershaft 24.

Conversely, in the event lever 85 is set to reverse (position R) starting from a normal gear, control unit 75 switches solenoid valve 77 to release clutch 9, then operates actuator 80 via solenoid valve 82 to position clutch 33 so as to connect gear 21 angularly to first drive shaft 7 whereafter clutch 9 is reengaged. Thus, in the course of the above sequence, clutch 40 and clutch 15 remain unaffected.

The above sequence therefore provides for the shifting to reverse gear, by virtue of power being transmitted, no longer directly, but via gears 21-41-21' shaft 36 and gears 29—29', from first drive shaft 7 to countershaft 24, and being inverted by idle gear 41. By appropriately sizing gear pairs 21—21' and 29—29', it is possible to obtain a gear ratio of 1 (though inverted) or of a predetermined value other than 1.

Starting from a low forward gear, two possibilities are available: shifting back to a normal forward gear, with no interruption in torque, by operating button H; or switching to reverse by setting lever 85 to R. In the first case (button H), control unit 75 simply switches solenoid valves 77, 78 in a manner to release clutch 15 and at the same time engage clutch 9. In the second case (reverse position R of lever 85), control unit 75 releases clutch 15, shifts clutch 33 to engage gear 21, and engages clutch 9, so that power is transmitted as described with reference to the engagement of a reverse gear starting from a normal forward gear.

Starting from a high forward gear, two possibilities are again available: direct down-shifting to a normal forward gear, with no interruption in torque, by operating button L; or switching to reverse by setting lever 85 to position R. In the first case (button L), control unit 75 simply switches solenoid valves 77, 78 in a manner to release clutch 15 and at the same time engage clutch 9. In the second case (reverse position R of lever 85), control unit 75 releases clutch 15, shifts clutch 33 to engage gear 21, and engages clutch 9, so that power is transmitted as described with reference to engagement of a reverse gear starting from a normal forward gear. At the end of the above sequence, control unit 75 conveniently also shifts clutch 40 to engage gear 19' and as such prepare the transmission for the next down-shift to a low gear.

Finally, it is possible to switch from a reverse gear to the corresponding low forward gear by setting lever 85 to position F, in which case control unit 75 releases clutch 9 and subsequently engages clutch 15 to engage the low gear in as much as clutch 40 is positioned so as to engage gear 19'.

The advantages of the transmission according to the present invention will be clear from the foregoing description.

First of all, for each normal gear, it provides for a high auxiliary gear and a low auxiliary gear, which are engageable with no interruption in torque and no need to operate the main clutch on the vehicle. The above therefore provides for better exploiting the power of the engine in operating conditions involving different work speeds, and in particular for increasing the number of operating points on the maximum power curve.

Secondly, it provides for adjusting the work speed in the vicinity of a given normal gear, for achieving maximum power and improving output. Furthermore, each normal gear presents a reverse gear engageable without using the main clutch, and which is particularly useful for operating attachments such as a front loader. Finally, the auxiliary gears and reverse gear corresponding to each normal gear are respectively engaged using a pushbutton (L, H) and a lever (85) operating electric switches, which is particularly advantageous from the ergonomic point of view.

It will be appreciated that, as opposed to mechanically, the clutches 38, 39 may be operated by hydraulic actuators controlled by unit 75 in response to operation of lever 84 as detected by appropriate transducer means.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a tractor transmission having a number of gears; an input shaft for receiving motion from the vehicle engine; first and second drive shafts coaxial with each other; first and second hydraulic clutches for selectively connecting said input shaft to said first drive shaft and to said second drive shaft, respectively; at least one driven shaft; and transmission means interposed between said first and second drive shafts and said driven shaft, and defining respective numbers of gear ratios, the improvement comprising:

at least one countershaft drivingly engageable with said driven shaft according to a first number of gear ratios;

first synchronized clutch means for selectively connecting a first countershaft to said first drive shaft according to a first and second gear ratio; and second synchronized clutch means for selectively connecting said first countershaft to said second drive shaft according to a third and fourth gear ratio respectively lower and higher than said first gear ratio.

2. The tractor transmission of claim 1 wherein the direction of rotation of said at least one countershaft when connected to said first drive shaft according to said first gear ratio is opposite to the direction of rotation of said at least one countershaft when connected to said first drive shaft according to said second gear ratio.

3. The tractor transmission of claim 2 wherein both said third and fourth gear ratios effect rotation of said first countershaft in a same direction.

4. The tractor transmission of claim 1 wherein said at least one countershaft is coaxial with said first and second drive shafts; said first synchronized clutch means selectively connecting said first drive shaft to said first countershaft directly and via an inverting train.

5. The tractor transmission of claim 4 further comprising a second countershaft drivingly engageable with a first countershaft and selectively connectable to said second drive shaft by respective gear pairs respectively defining said third and fourth gear ratios and selectively activated by a second clutch means.

6. The tractor transmission of claim 5 wherein said inverting train includes a gear connectable to said first drive shaft by a first clutch means; a second gear integral with said second countershaft; and an idle gear interposed between said first gear and said second gear.

7. The tractor transmission of claim 6 wherein said first countershaft and said driven shaft are connectable by a plurality of gear pairs defining said first number of ratios; one gear in each said gear pair being fitted to one of said shafts, and the other gear in each said gear pair being provided in an idle manner on the other of said shafts; and said idle gears being selectively connectable to said respective shaft by third synchronized clutch means.

8. The tractor transmission of claim 7 further comprising:

hydraulic control means for controlling said clutches;

first actuating means for said first clutch means;

second actuating means for said second clutch means; and a control unit for controlling said hydraulic control means and said actuating means.

9. The tractor transmission of claim 8 further comprising:

manual selecting means; and transducing means for said manual selecting means and connected to said control unit for supplying it with input signals in response to operation of said manual selecting means, said control unit controlling said first and second actuating means and said hydraulic control means of said clutches in response to said input signals and according to predetermined operating sequences.

10. The tractor transmission of claim 9 wherein said manual selecting means comprises a first lever for controlling said first actuating means; and a pair of pushbuttons for controlling said second actuating means.

11. The tractor transmission of claim 10 wherein said pushbuttons are located on a second lever controlling said third clutch means.

12. The tractor transmission of claim 11 further comprising:

a main stage comprising said input shaft, said clutches, said driven shaft, and said transmission means interposed between said input shaft and said driven shaft; and a range reducer cascade connected to said main stage and comprising the output shaft of the transmission, and second transmission means interposed between said driven shaft and said output shaft and defining a second number of gear ratios.

* * * * *